Dec. 20, 1927.  
J. H. KEYS  
1,653,103  
HOSE REEL  
Filed Feb. 20, 1922
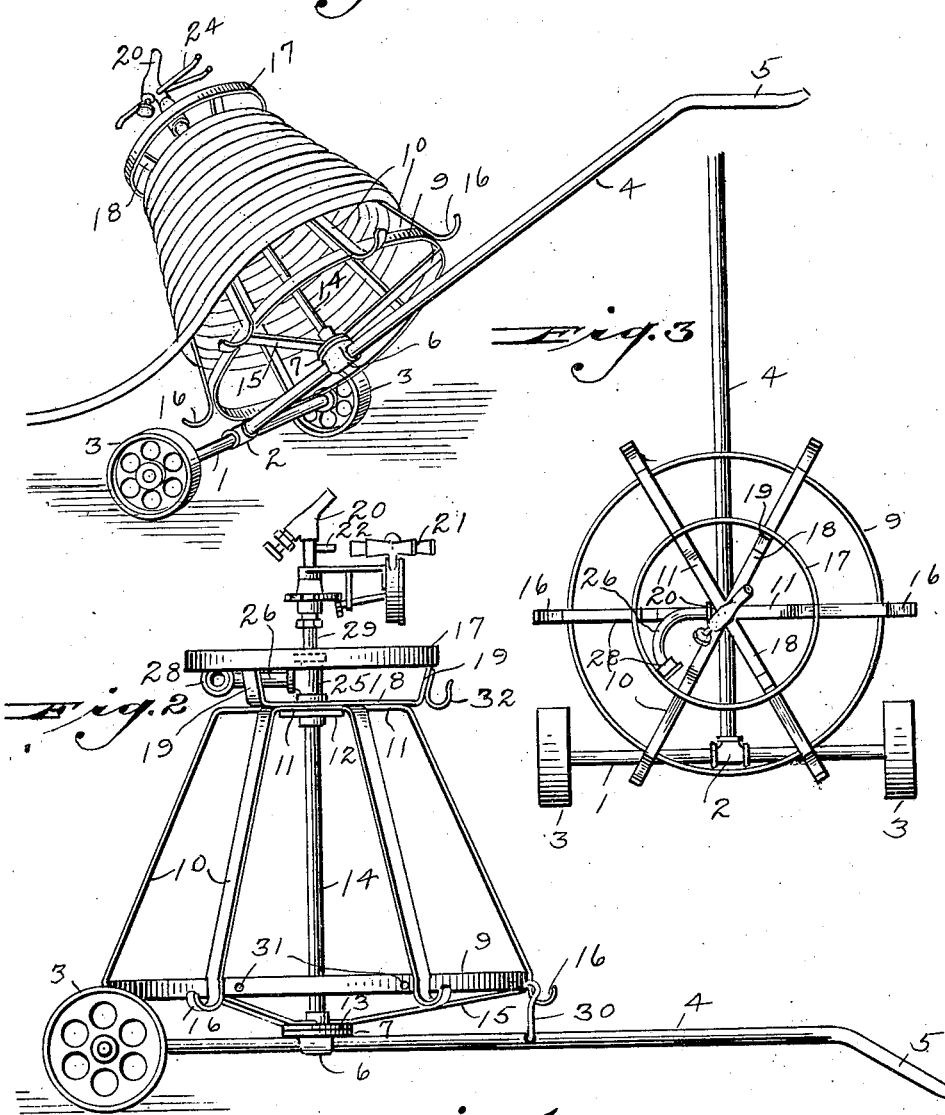

Patented Dec. 20, 1927.

1,653,103

UNITED STATES PATENT OFFICE.

JOHN H. KEYS, OF DAYTON, OHIO, ASSIGNOR TO THE DAYTON IRRIGATION COMPANY, OF DAYTON, OHIO, A CORPORATION OF OHIO.

HOSE REEL.

Application filed February 20, 1922. Serial No. 537,755.

My invention relates to water distribution and more particularly to portable hose reels and sprinkler apparatus.

The present invention contemplates a hose reel mounted upon carrying wheels for convenience of transportation, and having a discharge nozzle or sprinkler device mounted in conjunction with the reel, with which the hose upon the reel is operatively connected, thereby enabling the sprinkler or discharge nozzle to be utilized at greater or less distances from the source of supply of water under pressure, without the necessity of removing an excess portion of the hose from the reel. It also contemplates a reel wherein the hose when wound thereon will be self drained, and the weight of the reel and hose will be amply balanced when being transported.

The object of the invention is to simplify the structure as well as the means and mode of operation of hose reels and sprinkler systems in general whereby they will not only be cheapened in construction, but will be more efficient in use, convenient in operation, easily transported and unlikely to get out of repair.

A further object of the invention is to provide a hose reel revoluble about an upright or vertical axis of such character as to be durable and so arranged as to be convenient for operation in retrieving or paying out the desired length of hose.

A further object of the invention is to provide a convenient and suitable support for an automatic sprinkler device, capable of being operatively connected with the source of supply water under pressure by the removal from the reel of any desired length of hose less than a complete section.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Fig. 1 is a perspective view of the hose reel and sprinkler support forming the subject matter hereof, in position for transportation and for automatically paying out a desired length of hose. Fig. 2 is a side elevation of the reel and sprinkler apparatus in operative position, but with the hose removed to disclose the structural features of the reel. Fig. 3 is a top plan view of the assembled device. Fig. 4 is a detail sectional view of the mounting or bearing trunnion for the reel.

Like parts are indicated by similar characters of reference throughout the several views.

While the particular reel as designed herein has been shown adapted for use with an automatic sprinkler unit, it is to be understood that such sprinkler unit is not necessary and is not an essential part of the invention, but may be entirely omitted and the device employed simply as a reel or carrier for hose. However, as illustrative of the fact that the apparatus when embodying a sprinkler head is not dependent upon the particular type of sprinkler device, there have been shown in the drawings, two distinct forms of sprinkler units mounted upon the reel.

While various materials and modes of construction may be employed, there is shown in the drawing, a simple, economical and convenient structure, wherein the carrier part of the apparatus is constructed from pipes and fittings, while the reel portion is formed from strap iron or metal strips which may be readily bent into proper form and secured by welding or riveting.

Referring to the accompanying drawings, 1 is an axle section which may be for convenience and economy of manufacture two pieces of pipe interconnected medially by a T-fitting 2. The axle section 1 carries at each end a carrying wheel 3 while extending from the pipe T-fitting 2 is a length 4 of pipe forming a tongue by which the apparatus may be pulled or pushed from place to place. The outer end of the tongue section 4 is deflected or bent laterally as at 5 to form a support or rest as shown in Fig. 2, by which the tongue will be normally supported when at rest in a horizontal position with the axis of the reel vertical.

Secured upon the tongue or handle portion 4 in proximity to the axle 1 is a fitting 6 comprising a disc 7, from which projects upwardly a stud or pintle 8. The hose reel or carrier is mounted upon and rotates about this pintle. It comprises a cage like structure of substantially truncated conical form, comprising a base hoop 9, from which extends upwardly and inwardly in diagonal relation, frame bars or reel bars 10. These frame bars or reel bars 10 at their upper ends extend radially inwardly as at 11 and are attached to a centrally disposed head or disc 12. This disc or head 12 as well as a similar disc or head 13 at the bottom of the reel may comprise standard plumbing fittings known as floor flanges, and are interconnected by an intermediate axial strut 14, which for convenience and economy may comprise a short length of pipe. The base hoop 9 of the reel structure is interconnected with the head or flange 13 at the lower end of the axial strut 14, by means of radiating arms 15. The lower ends of the frame bars or reel bars 10 are extended outwardly in the form of hooks or curved fingers 16, which will effectively support the lowermost course of hose upon the reel. In order to conveniently rotate and control the winding and unwinding of the hose about the reel structure, there is provided at the upper end of the reel a hand ring comprising a hoop 17 of somewhat smaller diameter than the base hoop 9, but preferably though not necessarily somewhat larger than the top of the truncated conical reel body. This hand ring or hoop 17 is connected fixedly with the reel body by means of radial arms 18 upturned at their outer ends 19, and united with the hoop or ring 17. The parts of the reel including the hoops or rings 9 and 17, and the bars and arms 10 and 18 with the flanged heads or collars 12 and 13 are preferably interconnected or united by welding, brazing or other means, but preferably by riveting. The reel thus constructed, is preferably mounted upon the pintle 8 which projects within the tubular strut 14, with the flanged head or collar 13 at the base of the reel bearing upon the flanged fitting 7, carried by the handle or tongue 4. The sprinkler unit may be of any suitable or convenient type. That shown in Fig. 2 is of the oscillating type, such as shown in my prior Patent No. 1,076,890, wherein the discharge nozzle 20 is slowly oscillated to and fro or rotated about a complete circle, by gear driven actuating mechanism under the influence of a jet impulse wheel 21, by impact of a stream from a jet nozzle 22. In lieu of this construction there is shown in Fig. 1, a sprinkler head of the whirling type, wherein the rotation of the sprinkler head is effected by jet propulsion under the influence of jets of water ejected from radially disposed arms 24.

In any event if a sprinkler head is employed, it is mounted concentrically with the reel and fixedly secured thereto. In Fig. 2 there is shown a T-fitting 25 connected with the flanged head 12 and strut pipe 14 of the reel, to which leads a lateral branch 26, having at its extremity a hose connection fitting 28. This lateral branch 26 is preferably though not necessarily curved laterally upon an easy arc, which will merge with the arc of the outermost course of hose surrounding the reel structure. The hose may be permanently connected with this lateral flange 26. That is to say, the hose need not be disconnected and reconnected each time the sprinkler is to be used. The connection may be an ordinary detachable hose connection, but may be left interconnected. As shown in Fig. 2 the sprinkler head is mounted upon the fitting 25 by a short length of pipe or nipple 29, so that the water supplied through the hose and through the lateral branch 26 of the fitting 25 passes thence through the nipple 29 to the sprinkler head and is discharged therefrom. It will be understood that the lower end of the T-fitting 25 or the axial strut pipe 14 of the reel is plugged or otherwise closed so that the water supply will not pass downwardly therethrough, but will necessarily be discharged through the sprinkler head. In using the apparatus the free end of the hose may be connected to the faucet or hydrant and the reel transported thence to the place of operation, allowing the hose to pay off the reel to the required length, but leaving the remainder of the hose wrapped about the reel, but connected at its upper end with the sprinkler head. Thus the water supply not only passes through the unreeled portion of the hose but also circulates around the reel through the portion thereon, until it is finally discharged through the sprinkler head mounted upon the top of the reel. Upon rewinding the hose inasmuch as the hose is wound downwardly in a descending spiral path, the water will automatically drain from the hose through the lower end. The lower courses of hose are supported by the outturned hooks or fingers on the lower ends of the reel bars 10, the reel is held locked in different positions of rotation by means of a detachable hook 30, carried upon the handle or tongue 4, and engageable in any one of a series of holes 31 in the base group 9. To provide for carrying a greater quantity of hose upon the reel, the excess length of which may be wrapped about the exterior of the first course or tier of convolutions, there is provided at the top of the reel a hook 32, with which the upper end of such independent or separate hose section may be engaged, while the remainder is wrapped thence about the reel and over the primary hose section wrapped thereon. The relative position of the reel upon the handle or tongue 4 in relation with the axle 1, is such that when the handle or tongue 4 is elevated as shown in Fig. 1 for transportation, the center of gravity of the reel structure and sprinkler head and the hose supply wrapped upon the reel will be substantially over the axle section 1, thereby supporting the structure in an equalized or balanced relation. Thus the weight of the structure and hose carried thereby is sustained almost wholly by the carrying wheels 3—3 rather than by the hand of the operator.

From the above description it will be apparent that there is thus provided a device of the character described, possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect, and the invention is therefore claimed in any of its forms or modifications within the legitimate and valid scope of the appended claims.

Having thus described my invention, I claim:

1. The combination with a revoluble hose reel mounted for rotation about a vertical axis, of an independently revoluble discharge nozzle mounted coincident with the axis of rotation of the reel, a hose coupling for connecting the hose upon the reel with the revoluble discharge nozzle, said discharge nozzle being revoluble relative to the reel, and the reel in turn being independently revoluble relative to the discharge nozzle.

2. In a construction of the character described, a revoluble hose reel, rotating about a vertical axis, a central standard therefor upon which the reel is carried, a hollow extension upon the central standard extending beyond the reel, a hose coupling for connecting hose upon the reel with the hollow extension of the standard for the delivery of fluid under pressure through the hollow extension of the standard while the reel is revolved to retrieve or pay out the hose.

3. A hose reel mounting and a rotatable reel thereon including a center strut, a base hoop connected with the center strut by radial arms, reel bars extending diagonally upwardly and inwardly from said hoop, the lower ends of said bars being deflected downwardly and outwardly beyond said hoop, the upper ends of said bars being connected with said center strut, the upper portion of said strut being hollow and extending above the level of the reel, a hose coupling for connecting hose upon the reel with the upper hollow portion of said central strut to deliver fluid under pressure throughout the extended end of said strut, a hand ring spaced above the upper ends of said reel bars and connected with the reel structure, said reel being rotatable about a substantially vertical axis.

In testimony whereof, I have hereunto set my hand this 13 day of February, A. D. 1922.

JOHN H. KEYS.